Jan. 15, 1952  H. J. F. COE  2,582,681
SURVEYING APPARATUS
Filed June 21, 1950  2 SHEETS—SHEET 1
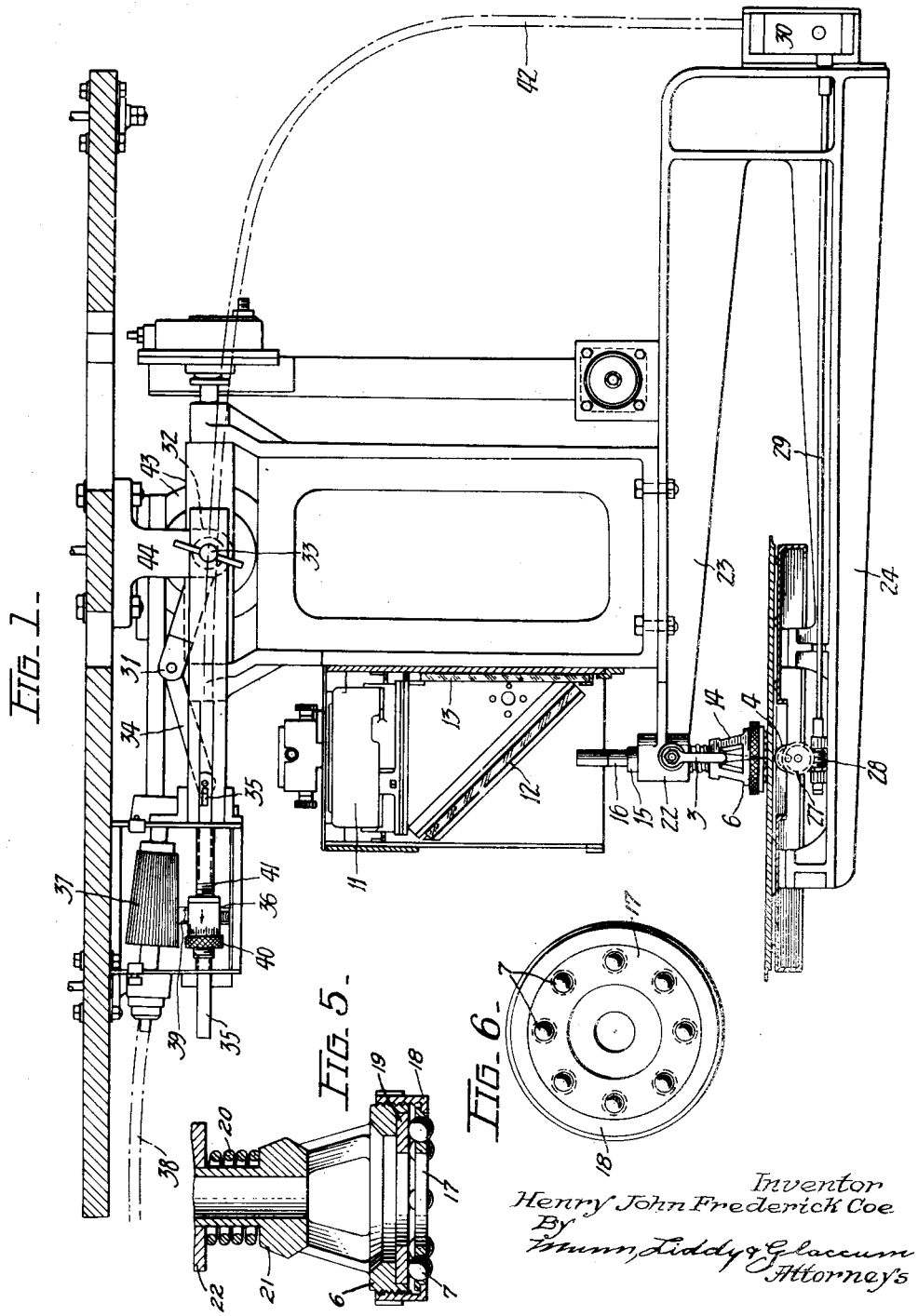
Inventor
Henry John Frederick Coe
By
Munn, Liddy & Glaccum
Attorneys Jan. 15, 1952     H. J. F. COE     2,582,681
SURVEYING APPARATUS
Filed June 21, 1950     2 SHEETS—SHEET 2
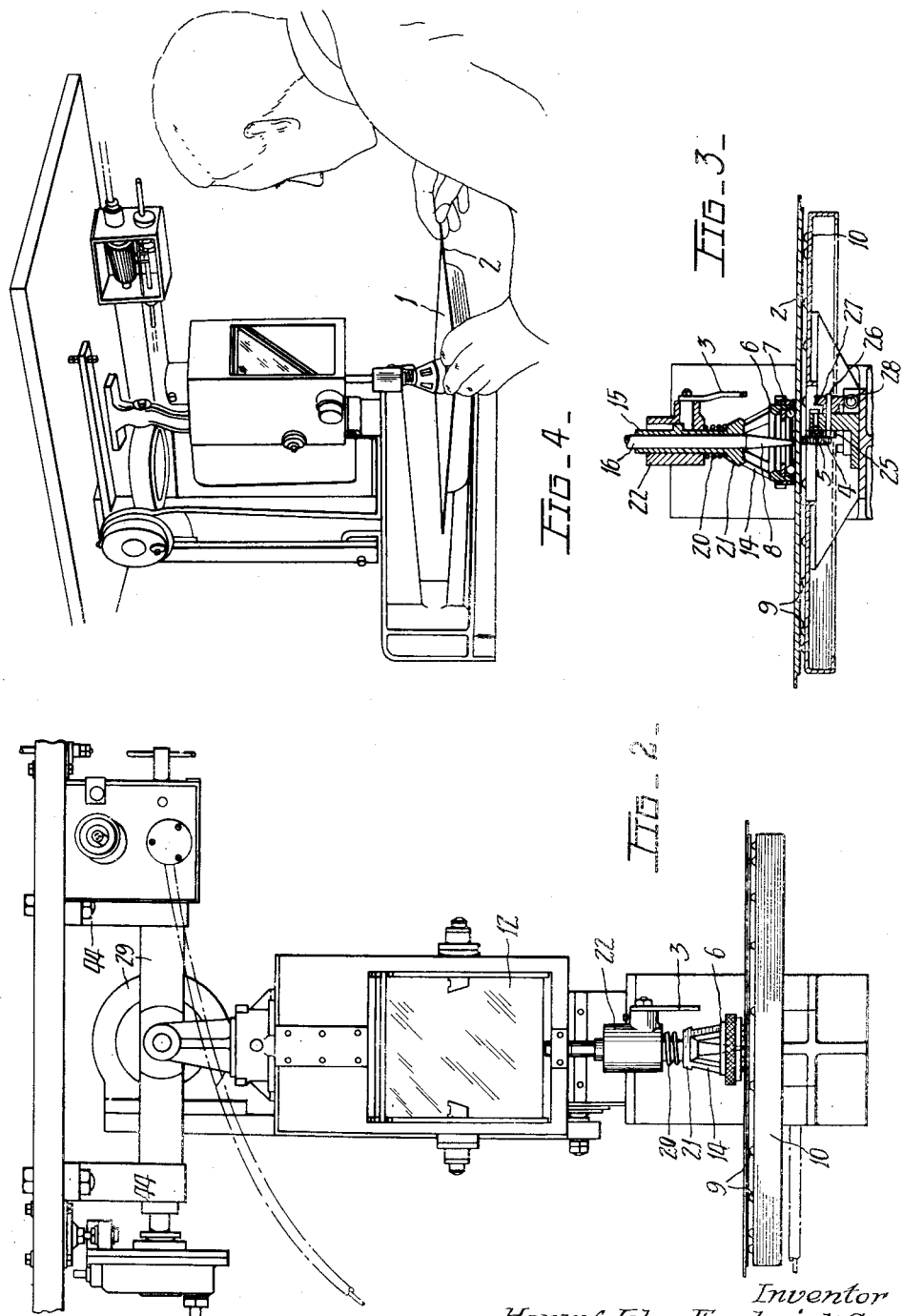
Inventor
Henry John Frederick Coe
By
Munn, Liddy & Glaccum
Attorneys Patented Jan. 15, 1952

2,582,681

UNITED STATES PATENT OFFICE 2,582,681

SURVEYING APPARATUS

Henry John Frederick Coe, Glen Iris, Victoria, Australia

Application June 21, 1950, Serial No. 169,498
In Australia June 10, 1943

4 Claims. (Cl. 346—8)

My invention relates to means for civil and military surveying and the objects of my invention are, first, to enable a survey to be effected by the passage of a vehicle over the route to be surveyed; second, to enable the position of the vehicle to be shown at any moment on a chart; third, to enable a continuous line recording the path of the vehicle to be drawn on the chart; fourth, to enable the relative positions of targets and artillery to be determined quickly; and, fifth, to enable the positions of tanks, infantry, ships or aeroplanes to be constantly known to the personnel thereof.

I attain these objects by the mechanism illustrated in the accompanying drawings, in which—

Figure 1 is a part sectional side elevation of the mechanism, and

Figure 2 is a front elevation thereof.

Figure 3 is a vertical section, viewed from the front, of the stylus holder, platen, knurled wheel and associated parts.

Figure 4 is a perspective view of the general assembly of the mechanism and illustrates the manner of operation.

Figure 5 is an enlarged view in sectional side elevation of the stylus holder, and Figure 6 is an underneath plan view of the stylus holder shown in Figure 5.

Referring now to the drawings, the chart 1 is carried by a rigid light flat metal platen 2 which is supported on the knurled edge of a wheel 4 adapted to be driven through worm gearing from the speedometer shaft (not shown) or similar drive gear of the vehicle. The platen is positioned beneath a stylus 8 or other indicator and is held down against the knurled wheel by a spring-loaded annular member 6 provided with ball bearings 7 which are pressed down against the chart and platen. The pressure of the spring is sufficient to hold the platen tightly against the knurled wheel in such a way that as the knurled wheel rotates the platen is moved proportionately to the movement of the vehicle and also in such a way that the platen can be turned readily by hand. The platen can thus be turned when the vehicle turns, so that during a survey the chart can be kept continuously correctly orientated in relation to the points of the compass.

As the indicator will normally be a stationary stylus, it is referred to hereinafter as a "stylus."

The mechanism is described herein as if the platen is in the horizontal position with the stylus positioned above it, because that is normally the most convenient arrangement. Nevertheless, it would be possible to tip the mechanism on end or otherwise or to invert it.

The stylus 8 is adapted to draw a track on the chart as the platen moves under it, and is carried centrally in relation to the ball bearings 7. Thus the platen is pivoted at a roving pivot which is always immediately beneath the stylus and which coincides with the point of contact between the platen and the knurled wheel. The platen rests upon pimples 9 on a base plate 10, so that there is a minimum of frictional resistance between the platen and base plate. The platen is thus positioned in a plane lying across the longitudinal axis of the stylus and normally approximately at right angles thereto.

In a housing 11 a compass with parallel line markings is positioned so that its image is reflected by a semi-transparent aluminized unbacked first mirror 12 on to an upright mirror 13 and then back again horizontally and through the semi-transparent mirror. This mirror 12 is arranged at an inclination to the chart and the reflection of the chart can be viewed in the mirror while the reflection of the compass card can be viewed through this mirror. To facilitate the maintaining of the line markings of the chart and compass card in register or parallel, as viewed in the mirrors, despite bumping and other uneven movements of the vehicle, the distance traversed by a light beam from the compass card to the inclined mirror and from there to the upright mirror and back through the inclined mirror to the eye of the observer should be approximately the same as the distance traversed by a light beam from the chart to the inclined mirror and from there to the eye of the observer.

The platen is turned by hand about the roving pivot so that as the vehicle travels along its route the lines on the chart coincide with or are parallel to the corresponding lines on the grid of the compass and thus the chart is maintained in correct position in relation to the points of the compass. At the same time, rotation of the knurled wheel by the speedometer or similar drive gear of the vehicle moves the platen progressively in relation to the stylus. The stylus thus marks on the chart an accurate reproduction of the route taken by the vehicle.

The stylus could be supported by the upper portion of the framework of the unit and the knurled wheel and its drive by the lower portion of the framework but it is preferable to maintain a more accurately horizontal position for the compass and platen by the construction illustrated in the accompanying drawings. In this construction, the annular member 6 is carried by spider arms 14 formed integrally with a sleeve 15 in which is slidable the cylindrical stem 16 of the stylus. A ball housing 17 carrying ball bearings 7 is held in position on the lower side of the annular member 6 by a knurled retaining nut 18 which is screwed upwardly on the threaded exterior surface of the annular member to press the ball bearings 7 against a ring 19. The freedom of movement of the ball bearings can be controlled by suitable adjustment of the nut 18. The annular member 6 is normally pressed down against the chart by a compression spring 20 bearing against a shoulder 21 and a boss 22. The stylus and ball bearings can be raised from the chart against the action of the spring 20 by a cam arm 3. The boss 22 is integral with the upper horizontal arm 23 of a bifurcated member, the lower horizontal arm 24 of which carries the wheel 4 which supports and drives the platen. The wheel 4 is rigidly connected to a gear wheel 5 on the same shaft and is driven through this gear wheel, pinion 25, shaft 26, worm wheel 27, worm 28 on driving rod 29, gear box 30, and flexible connection 42 from the inclinator 31—39, or when that is not used, from the speedometer shaft (not shown). Preferably, two or more gear boxes are provided to allow for variation of the scale of the chart. Instead of driving the wheel 4 from the speedometer shaft it could be driven from any member rotating proportionately to a ground wheel of the vehicle. The whole device is suspended by gimbals 43 and plummer blocks 44 from the framework of the vehicle. The gimbals will normally be provided with hydraulic dampers or the like.

It has been found that for ordinary work, slope correction by means of the inclinator is not necessary. However for extremely accurate work the inclinator may be used to compensate for the slope of the terrain—especially in rugged country—and means may also be used to compensate for tire wear.

The principle of the slope corrector (or inclinator) is that the greater the slope the smaller is the horizontal component of the distance travelled. Consequently, the slope corrector is designed to adjust the drive accordingly; for example, tipping of the framework may swing up or down an arm connected to the journal of the gimbals which carry the whole instrument and thus may move proportionately a portion of a conical change speed friction gear. A suitable construction of inclinator is shown in Figure 1 and indicated in Figure 4. A crank arm 31 is connected to the journal 32 of the main gimbal ring by a release gear comprising a push rod 33 which is in engagement with the crank arm and can be brought into and out of engagement with a slotted end of the journal. The crank arm is pivotally connected by a link 34 to a shaft 35 carrying a driven member 36, to which are attached brackets 39 carrying an idler wheel (which is hidden in the drawing by the brackets 39). A cone 37 is driven through a flexible drive 38 from the speedometer shaft or similar drive and drives the idler wheel. The idler wheel engages and drives the driven member 36. Consequently, movement of the gimbal journal moves the crank arm and draws the idler wheel (and driven member 36) to a smaller circumference of the cone and so reduces the rotation of the wheel 4 and thus shortens the line ultimately drawn on the chart by the movement of the platen past the stylus. As the inclinator is merely a refinement which can be used or not as desired and which is thus subsidiary to the main invention it is not shown in great detail on the drawings.

In the tire compensator a drive can be adjusted (as, for example, by a change speed friction gear or other change speed gear) so that a ground wheel of smaller or larger diameter than normally produces the same ultimate movement as a wheel of normal diameter.

The tire compensator can be incorporated in the inclinator, as shown in Figure 1, by providing a micrometer nut 40 engaging a screw thread 41 on the shaft 35. The zero position of the driven member and idler wheel may thus be set according to the circumference of the ground wheel which originates, or is co-ordinated with, the drive of the mechanism. This micrometer also allows calibration of the inclinator from time to time. If preferred, the tire compensator may be constructed separately from the inclinator.

Obviously, tire compensation and slope correction could be attained by change speed mechanisms other than frictional.

A hand model of essentially the same construction as the normal vehicle model may be provided, more especially for use in very rugged country where a vehicle could not readily penetrate. In this case the fittings may be carried by a light wheel which is of measured circumference and which is held by a light handle, pole or the like. The wheel and handle thus function as the vehicle. If the terrain is so extremely rugged or so covered with undergrowth and the like that the rolling of a wheel thereon is not feasible, sights may be taken from point to point, the observer measuring or estimating the distances between points and turning the wheel to the requisite extent at each stage. The platen is driven in proportion to the turning of the wheel in exactly the same way as when it is actuated by the turning of a ground wheel of a vehicle. As the invention does not reside in the carrying wheel or other carrying vehicle, neither wheel nor vehicle is illustrated on the drawings.

When applied to ships or aeroplanes, the instrument would be driven from the engine main shaft or from a suitable auxiliary drive. It would, of course, be necessary to make allowance for drift as is customary when computing the distances travelled by ships or aeroplanes.

I claim:

1. Means for surveying comprising in combination a vehicle, a driving wheel, means to rotate said driving wheel in proportion to the speed of the vehicle, a platen one face of which is in contact with a point on the circumference of said driving wheel, a chart supported on the other face of said platen, an annular member, a ball housing, ball bearings in said housing, a nut attaching said housing to said annular member, a spider secured to said annular member, a sleeve secured to said spider, a bearing within which the sleeve is slidable, a shoulder on said sleeve, a spring around said sleeve between said bearing and said shoulder to press said ball bearings against said chart and to press said platen against said driving wheel, and a stylus supported in said sleeve so that its point can contact said chart within the area defined by said ball bearings and in such a position that there is no displacement on the chart of the point of contact between the stylus and the chart when the platen is pivoted on said driving wheel.

2. In means for surveying as claimed in claim 1, a projection on said sleeve and a cam to move said sleeve by means of said projection against the action of said spring.

3. Surveying apparatus including the combination of a platen having longitudinal and pivotal movement and on which a chart may be supported, an annular member having a circular series of ball bearings, a sleeve on said annular member disposed centrally thereof, an arm which supports said sleeve for up and down movement, a stylus supported in the sleeve so that its point can contact said chart within the area defined by said ball bearings so that there is no displacement on the chart of the point of contact between the stylus and the chart when the platen is given pivotal movement, and resilient means acting on the annular member and the arm for yieldingly retaining the ball bearings and the point of the stylus in contact with said chart.

4. Surveying apparatus as set forth in claim 3, and cooperative means on the sleeve and the arm operable to move the sleeve relatively to said chart so to raise the ball bearings and the stylus from the chart subject to the action of said resilient means.

HENRY JOHN FREDERICK COE.

REFERENCES CITED

The following references are of record in the file of this patent:

UNITED STATES PATENTS

| Number    | Name     | Date          |
|-----------|----------|---------------|
| 1,848,605 | Conway   | Mar. 8, 1932  |
| 2,245,116 | Rhatigan | June 10, 1941 |

FOREIGN PATENTS

| Number  | Country | Date          |
|---------|---------|---------------|
| 3,927   | Austria | Apr. 25, 1901 |
| 76,124  | Austria | Apr. 10, 1919 |
| 124,749 | Germany | Nov. 6, 1901  |